US006866429B2

United States Patent
Wang et al.

(10) Patent No.: US 6,866,429 B2
(45) Date of Patent: Mar. 15, 2005

(54) METHOD OF ANGLE FUSION SPLICING SILICA FIBER WITH LOW-TEMPERATURE NON-SILICA FIBER

(75) Inventors: Jiafu Wang, Tucson, AZ (US); Weijiong Li, Tucson, AZ (US)

(73) Assignee: NP Photonics, Inc., Tucson, AZ (US)

( * ) Notice: Subject to any disclaimer, the term of this patent is extended or adjusted under 35 U.S.C. 154(b) by 121 days.

(21) Appl. No.: 10/374,001

(22) Filed: Feb. 25, 2003

(65) Prior Publication Data

US 2003/0152342 A1 Aug. 14, 2003

Related U.S. Application Data

(63) Continuation-in-part of application No. 09/963,727, filed on Sep. 26, 2001, now Pat. No. 6,705,771.

(51) Int. Cl.⁷ .............................................. G02B 6/255
(52) U.S. Cl. .............................. 385/96; 385/95; 385/97; 385/98; 219/121.13; 65/501
(58) Field of Search ................ 385/95–98; 219/121.13; 65/501

(56) References Cited

U.S. PATENT DOCUMENTS

| | | | |
|---|---|---|---|
| 3,615,312 A | | 10/1971 | Landry et al. .................... 65/4 |
| 5,560,760 A | | 10/1996 | Toeppen ....................... 65/407 |
| 5,649,040 A | | 7/1997 | Ljungqvist et al. ........... 385/95 |
| 6,186,675 B1 | * | 2/2001 | Ruegenberg ................. 385/96 |
| 6,244,757 B1 | | 6/2001 | Kim et al. ..................... 385/96 |
| 6,289,027 B1 | | 9/2001 | Lawrence et al. ............. 372/6 |
| 6,294,760 B1 | * | 9/2001 | Inoue et al. ................. 219/383 |
| 6,652,163 B2 | * | 11/2003 | Fajardo et al. ................ 385/96 |
| 6,705,771 B2 | * | 3/2004 | Jiang et al. .................... 385/96 |
| 2001/0047668 A1 | | 12/2001 | Ochiai et al. ................. 65/407 |
| 2002/0141705 A1 | * | 10/2002 | Duelli et al. .................. 385/49 |
| 2002/0164132 A1 | * | 11/2002 | Tian ............................. 385/98 |

FOREIGN PATENT DOCUMENTS

WO  WO 90/07134  6/1990  ........... G02B/6/255

OTHER PUBLICATIONS

Adam E. Barnes et al., Sapphire Fibers: Optical Attenuation and Splicing Tecniques, Applied Optics, Oct. 20, 1995, pp. 6855 to 6858, vol. 34, No. 30.

Yutaka Kuroiwa et al., Fusion Spliceable and High Efficient Bi2O3–based EDF for Short–length and Broadband Application Pumped at 1480 nm., pp. TuI5–1 to TuI5–3, 2000 Optical Society of America.

Naoki Sugimoto et al., C+L Band Amplifying Properties in Short–length Bismuth Oxide Based Erbium Doped Fibers.

Asahi Glass Company, Technical Bulletin Bismuth–based EDF,—A Broadband, High Efficiency and Compact EDF, Technical bulletin rev. 2.22, Feb. 23, 2000, pp. 1 to 17.

W. H. Loh et al., Single–sided Output Sn/Er/Yb Distributed Feedback Fiber Laser, Appl. Phys. Letter 69 (15), Oct. 7, 1996, pp. 2151 to 2153, 1996 American Institute of Physics.

(List continued on next page.)

*Primary Examiner*—Akm Enayet Ullah
*Assistant Examiner*—Daniel Petkovsek
(74) *Attorney, Agent, or Firm*—Eric A. Gifford

(57) ABSTRACT

A low-cost approach is provided for forming a low splice loss, low back reflection loss and mechanically robust angle-fusion splice between a standard silica fiber and a low-temperature non-silica glass fiber. This is accomplished by angle cleaving the silica fiber, square cleaving the non-silica fiber and then asymmetrically heating the fibers to form an angle fusion splice. A matched angle at the end of the non-silica fiber is generated in situ during the splicing process. The tip of the angle-cleaved silica fiber may be polished flat back to the edge of the core to reduce the range of motion of the non-silica fiber during splicing thereby further reducing splice loss and enhancing the mechanical strength of the joint.

25 Claims, 10 Drawing Sheets

OTHER PUBLICATIONS

H.Y. Tam, Simple Fusion Splicing Technique for Reducing Splicing Loss Between Standard Singlemode Fibres and Erbium–doped Fibre, Electronics Letters, Aug. 15, 1991, pp. 1597 to 1599, vol. 27, No. 17.

B. B. Harbison et al., Fusion Splicing of Heavy Metal Fluoride Glass Optical Fibres, Electronics Letters, 1989, vol. 25, No. 18.

L. Rivoallan et al., Fusion Splicing of Fluoride Glass Optical Fibre with CO2 Laser, Electronics Letters, May 12, 1988.

Tetsuya Miyazaki et al., Nd–Doped Double–Clad Fiber Amplifier at 1.06 um, Journal of Lightwave Technology, Apr. 1998, pp. 562 to 566, vol. 16, No. 4, 1998.

Wenxin Zheng, Real Time Control of Arc Fusion for Optical Fiber Splicing, Journal of Lightwave Technology, Apr. 1993, pp. 548 to 553, vol. 11, No. 4, 1993.

Wenxin Zheng et al., Erbium–Doped Fiber Splicing and Splice Loss Estimation, Journal of Lightwave Technology, Mar. 1994, pp. 430 to 435, vol. 12, No. 3, 1994.

K. Egashira et al., Optical Fiber Splicing with a Low–power CO2 Laser, Applied Optics, Jun. 1977, pp. 1636 to 1638, vol. 16, No. 6.

A. Berg et al., Arc Fusion Splices with Improved Strength (4.8 GPa) Approaching the Strength of the Fibre, Electronics Letters, Dec. 15, 1994, IEE 1995.

D. L. Bisbee, Splicing silica fibers with an electric arc, Applied Optics, Mar. 1976, vol. 15, No. 3.

* cited by examiner

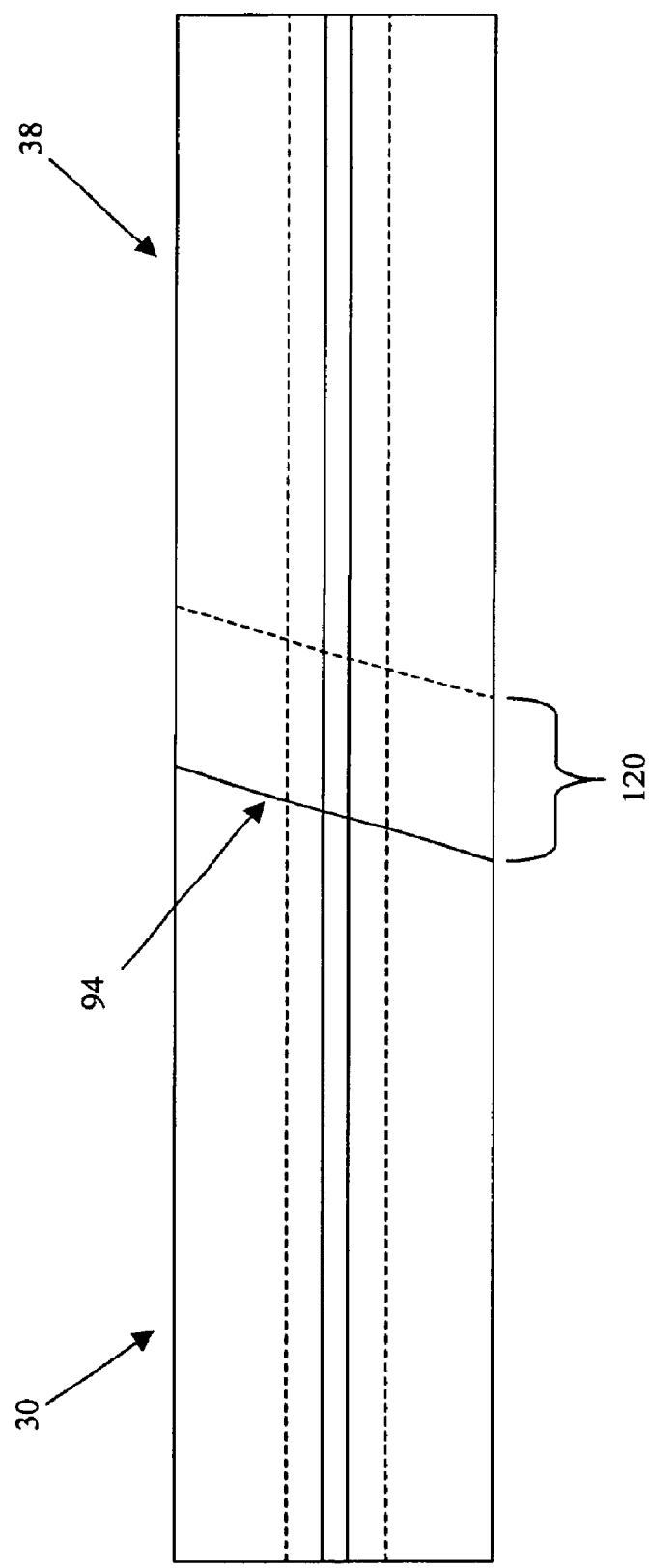

METHOD OF ANGLE FUSION SPLICING SILICA FIBER WITH LOW-TEMPERATURE NON-SILICA FIBER

CROSS-REFERENCE TO RELATED APPLICATIONS

This application is a cont-in-part of U.S. applications Ser. No. 09/963,727 entitled "Method of Fusion Splicing Silica Fiber with Low-Temperature Multi-Component Glass Fiber" filed on Sep. 26, 2001, now U.S. Pat. No. 6,705,771 the entire contents of which are incorporated by reference.

BACKGROUND OF THE INVENTION

1. Field of the Invention

The present invention relates to the field of fiber optics, and more specifically, to the angle fusion splicing of low-temperature non-silica fibers with silica glass fibers.

2. Description of the Related Art

In the field of fiber optics, joining or splicing of optical fibers is a well-known and widely practiced technique. The most common method for splicing of two standard fused silica fibers is based on the fusion of the adjacent ends of the optical fibers that are to be joined. The fibers are brought close to each other and are aligned so that their cores are coaxial with each other. Heat is transferred to both fiber ends by a filament around the fiber or an electric arc between two electrodes that are positioned on either side of the axis of the two optical fibers. This heat is sufficient to soften the glass at the end of each of the two fibers to be joined. The optical fibers are then brought in contact and the hardening of the softened glass occurs as the temperature is lowered below the softening and glass transition temperatures to form a permanent bond between the fibers. See, for instance, D. L. Bisbee, "Splicing Silica Fibers with an Electric Arc", Applied Optics, Vol. 15, No. 3, March 1976, pp. 796–798. These techniques have been designed for and used to fuse fibers that have the same or very similar material compositions, e.g. two standard silica telecom fibers, in many applications including erbium doped fiber amplifiers (EDFAs).

In many applications, two fibers having different glass compositions and substantially different softening temperatures must be fusion spliced. Typically, a special fiber of some sort is being fusion spliced to a standard silica telecom fiber. The standard fusion splicing process must be modified to accommodate the difference in softening temperatures and provide a low loss (<0.3 dB), low back reflection (<−50 dB) and mechanically reliable fusion splice.

The Asahi Glass Company (AGC) conducted and published an extensive study "Technical Bulleting: Bismuth based EDF—A Broadband, High Efficiency and Compact EDF" on the effectiveness of different glasses to provide compact EDFAs and concluded that Bismuth based glass provided the best overall properties. A key factor in this determination was AGC's ability to form mechanically reliable low-loss fusion splices between Bismuth Oxide fibers and silica fibers and their inability to form such splices with Tellurite, Fluoride and Phosphate glasses, which have lower glass transition and softening temperatures than Bismuth based glass. AGC used an arc discharge at the gap between the fibers to form the fusion splice. However, Bismuth based glass does not provide the gain per unit length or other spectroscopic properties of Phosphate glass.

U.S. patent application Publication Ser. No. US 2001/0047668 A1 published on Dec. 6, 2001 details Asahi's method of fusion splicing Bismuth based on glass fibers with standard silica fibers. The quartz type glass fiber (SF) and the bismuth $Bi_2O_3$ based glass fiber (BF) are aligned so that their entire end surfaces are in contact with each other. Then the SF and BF fibers are set so that the arc discharge elements intersect the SF fiber at least 1 micron away from the surface contact. A voltage is applied between the electrodes to heat the glass fibers so that the temperature is highest on the SF fiber at least 1 micron from the surface contact. If the distance is less than 1 micron, significant plastic flow or fugacity may take place at the end surface of the BF fiber, whereby the abutted end surface can not appropriately be fusion-spliced, and connection loss tends to be significant.

Asahi's publication also provides for forming an angle-splice, i.e. where the angle formed by the end surfaces with respect to the fiber axis is less than 90°, to reduce reflection of light off the splice due to the difference in refractive index between the SF and BF fibers. Cleaving both fibers with complementary angles between 60° and 87°, carefully aligning the fibers so that their entire end surfaces are in contact with each other and then fusing the fibers as described above, forms the angle splice. Aligning two complementary angle-cleaved fibers is a much more difficult and time-consuming task than aligning a pair of square end fibers. Hence, the yield and cost are more expensive. Furthermore, angle cleaving specialty fibers such as Bismuth based fiber is a difficult low yield process because the mechanical strength of these glasses is weaker than silica glasses.

There remains an industry need for a low-cost high-yield method of angle fusion splicing low-temperature multi-component glasses such as Phosphate, Bismuthate and Tellurite to standard silica fibers for use in compact EDFA and other telecom applications.

SUMMARY OF THE INVENTION

In view of the above problems, the present invention provides a low-cost approach for providing a low splice loss, low back reflection and mechanically robust angle fusion splice between a standard silica fiber and a low-temperature non-silica glass fiber such as multi-component glasses consisting of phosphate, germanate or tellurite.

This is accomplished by angle cleaving the silica fiber, square cleaving the non-silica fiber and then asymmetrically heating the fibers to form an angle fusion splice. A matched angle at the end of the non-silica fiber is generated in situ during the splicing process. This method avoids angle cleaving of a non-silica fiber and the alignment of two angle-cleaved fibers, which are low yield and time consuming processes. In another embodiment, the tip of the angle-cleaved silica fiber is polished flat back to the core to reduce the range of motion of the non-silica fiber during splicing. A "refuse" program is introduced to remarkably further reduce the loss and back reflection. In some cases, the multi-component glass fiber may be drawn with a special outer cladding layer such as silicate glass that is thermally compatible with the multi-component glass and yet compatible with forming strong thermal diffusion bonds with the silica fiber. The use of a special outer cladding layer on the multi-component fiber may allow the use of conventional symmetric heating.

Asymmetric heating is achieved by placing the heating element along the silica fiber at a distance $d_o$ from the angle splice so that the temperature is highest at a point on the silica fiber away from the fiber tip. This asymmetric configuration heats but does not soften the silica fiber and heats the non-silica glass fiber to above its softening temperature directly via the heating elements and indirectly via the silica fiber. Thus, the temperature at the end of the silica fiber $T_{si}$ is greater than the temperature at the end of the non-silica fiber $T_{mc}$. This temperature gradient serves to improve thermal diffusion between the two fibers when brought into contact thereby strengthening the fusion splice. Either electrode arc or resistive heaters can be used to fuse the fibers. In either case, the heat is preferably localized onto the silica fiber, which reduces the direct heating of the non-silica fiber, to maximize the temperature gradient and increase bond strength.

These and other features and advantages of the invention will be apparent to those skilled in the art from the following detailed description of preferred embodiments, taken together with the accompanying drawings, in which:

BRIEF DESCRIPTION OF THE DRAWINGS

FIG. 7 is an exploded sectional view of the interface between the multi-component glass fiber and the silica fiber shown in FIG. 6a;

DETAILED DESCRIPTION OF THE INVENTION

Figure 1:
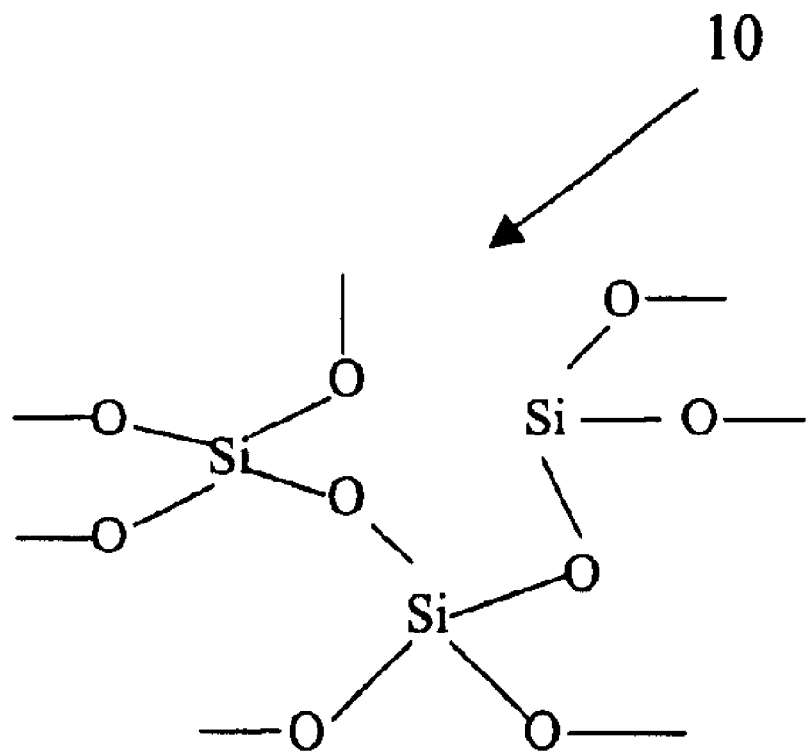
FIG. 1 is a diagram of the glass network for silica.

The present invention provides a low-cost approach for providing a low loss (<0.3 dB fusion splicing loss), low back reflection (<−50 dB or lower) and mechanically robust angle-fusion splice between a standard silica fiber and a specialty low-temperature non-silica glass fiber. This type of angle fusion splice is particularly useful in and was motivated by the development of a compact EDFA. To eliminate fiber management and reduce package size one must use a glass fiber that provides high gain per unit length. This in turn dictates a glass such as a multi-component phosphate glass that has a high solubility of rare-earth dopants such as erbium and ytterbium and exhibits the necessary spectroscopic properties.

Although the method of angle fusion splicing is generally applicable to any low-temperature non-silica glass fiber, the invention will now be described in the context of angle fusion splicing a low-temperature multi-component glass fiber to a standard silica fiber.

Low-Temperature Multi-Component Glasses

A subclass of multi-component glasses have a glass composition that contains one or more glass network formers (selected from $P_2O_5$ phosphate, $GeO_2$ germanate or $TeO_2$ tellurite) 30 to 80 weight percent, one or more glass network modifiers MO (alkaline-earth oxides and transition metal oxides such as BaO, CaO, MgO, Sro, ZnO, PbO and mixtures thereof) 2 to 40 weight percent and one or more glass network intermediators $L_2O_3$ ($Y_2O_3$, $La_2O_3$, $Al_2O_3$, $B_2O_3$ and mixtures thereof) 2 to 30 weight percent. The glass network formers are selected because their glass networks are characterized by a substantial amount of non-bridging oxygen that offers a great number of dopant sites for rare-earth ions. The modifier modifies the glass network, thereby reducing its melting temperature and creating additional dopant sites. The intermediator bridges some of the bonds in the network thereby increasing the network's strength and chemical durability without raising the melting temperature appreciably. The glass composition may be "alkali-metal-free" or may include additional network modifiers MO selected from alkali-metal oxides such as $K_2O$, $Na_2O$, $Li_2O$, and $Rb_2O$. The fiber core is then doped with high concentrations of rare-earth dopants such as erbium (0 to 5 wt. %) or co-doped with, for example, ytterbium (0 to 30 wt. %). The cladding layer(s) is (are) typically but not necessarily undoped glass.

As a result, the subclass of multi-component glasses has a much lower softening temperature (<600° C.) than silica (>1200° C.), which greatly simplifies the fiber drawing process but complicates the process of fusion splicing to silica fiber. A quality angle-fusion splice should exhibit low optical loss (<0.3 dB), low back reflection loss (<−50 dB) and good tensile strength (>100 g). Conventional wisdom holds that these types of low-temperature multi-component glass fibers cannot be reliably angle fusion spliced to standard silica fibers, the difference in softening temperatures is too large, the glass networks are not compatible, the multi-component fiber is too fragile to cleave and the alignment is too difficult. Asahi has demonstrated a similar asymmetric heating configuration for fusing square-cleaved or complementary angle-cleaved bismuth and silica fibers but was unable to effectively splice the lower temperature tellurite, fluoride and phosphate multi-component glasses.

Turning now to the figures, as can be readily seen in FIG. 1, the silica glass 10 (~100% $SiO_2$) consists of $SiO_4$ tetrahedra joined to each other at corners. Oxygen acts as a bridge between neighboring tetrahedra. This bonding structure results in a high softening temperature (>1200° C.) with minimal dopant sites.

Figure 2:
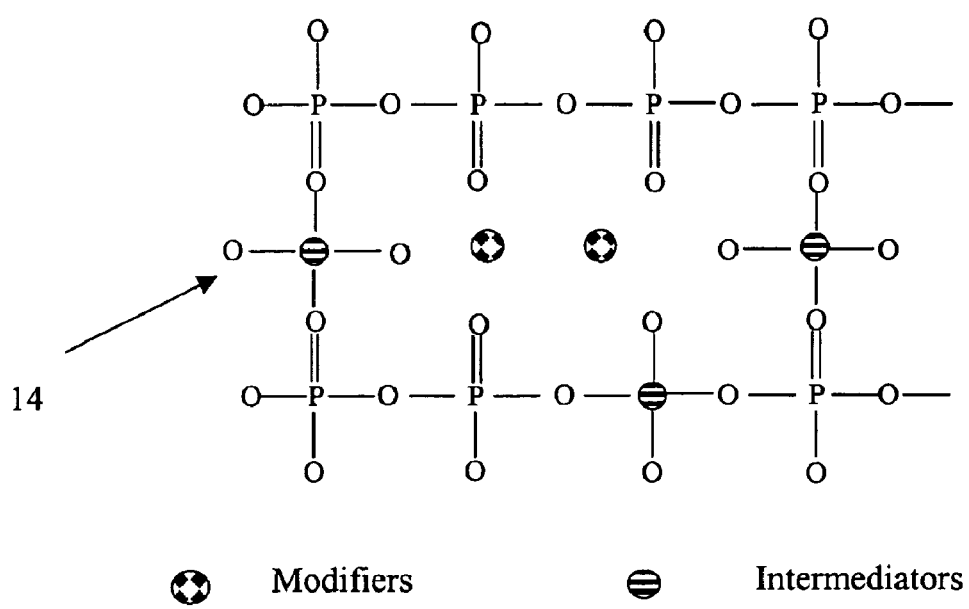
FIG. 2 is a diagram of the glass network for phosphate.

As shown in FIG. 2, low temperature multi-component phosphate glass 14 has a different bond structure than silica. The basic unit of structure is the $PO_4$ tetrahedron. Because phosphate (P) is a pentavalent ion, one oxygen from each tetrahedron remains non-bridging to satisfy charge neutrality of the tetrahedron. Therefore, the connections of $PO_4$ tetrahedrons are made only at three corners. In this respect, phosphate glasses differ from silica-based glasses. Due to the large amount of the non-bridging oxygen, the softening temperature of phosphate glasses is typically lower than silica glass. At the same time, the large amount of non-bridging oxygen in phosphate glass offers a great number of sites for rare-earth ions, which results in a high solubility of rare-earth ions. The modifier modifies the glass network, thereby reducing its melting temperature and creating even more sites for rare-earth ions. A uniform distribution of rare-earth ions in the glass is critical to obtain a high gain per unit length. The intermediator bridges some of the bonds in the network thereby increasing the network's strength and chemical durability without raising the melting temperature appreciably.

Asymmetric Fusion Splicing

The present invention provides a reliable angle-fusion splice between a silica fiber and a non-silica fiber including the aforementioned class of low-temperature multi-component glasses. This is accomplished by angle cleaving the silica fiber, square cleaving the multi-component fiber and then asymmetrically heating the fibers to form an angle-fusion splice. A matched angle at the end of the multi-component fiber is generated in situ during the splicing process. This method avoids angle cleaving of a non-silica fiber and the alignment of two angle-cleaved fibers. In another embodiment, the tip of the angle-cleaved silica fiber is polished flat back to the core to reduce the range of motion of the silica fiber to the multi-component fiber during splicing. In some cases, the multi-component glass fiber may be drawn with a special outer cladding layer such as silicate glass that is thermally compatible with the multi-component glass and yet compatible with forming strong thermal diffusion bonds with the silica fiber. The use of a special outer cladding layer on the multi-component fiber may, in some cases, allow the use of a conventional symmetric angle-fusion splice.

Figure 3A:
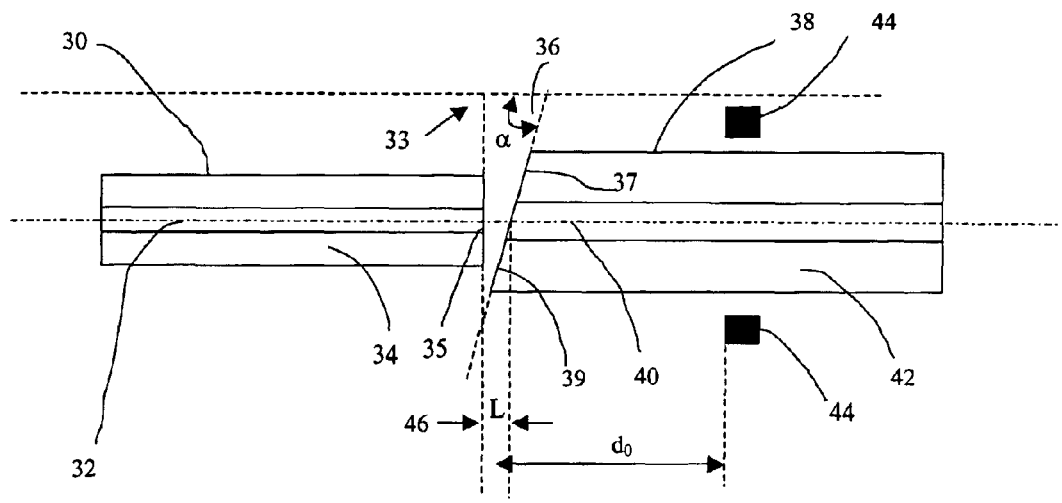
FIGS. 3a and 3b are diagrams for asymmetrically angle fusion splicing a multi-component glass fiber to a silica fiber in accordance with the present invention.
Figure 3B:
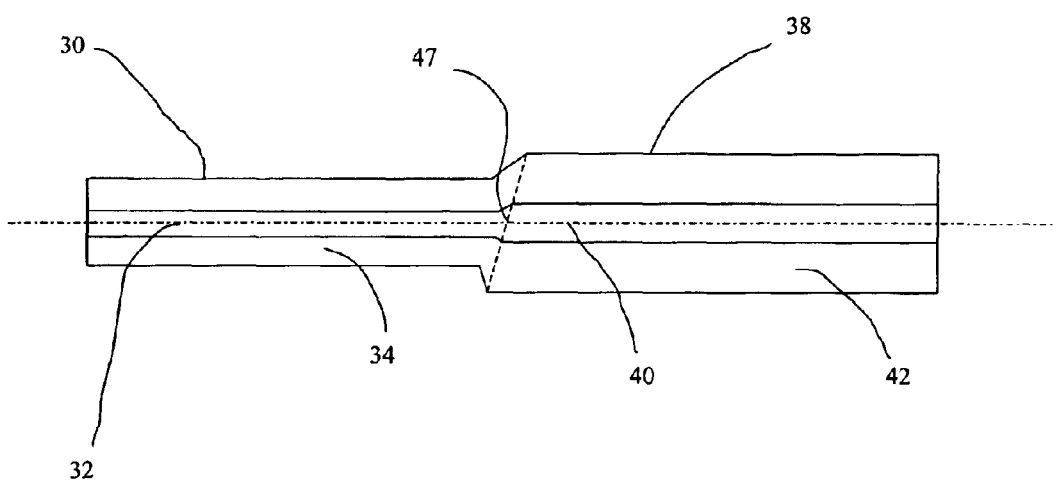

FIGS. 3a and 3b illustrate the asymmetric fusion splicing process in accordance with the present invention in which a specialty multi-component glass fiber 30, depicted here as a single-clad fiber having a core 32 and an inner cladding 34, is aligned and brought close to a silica telecom fiber 38 having a core 40 and a cladding 42. Multi-component glass fiber 30 has been square cleaved at an approximately 90° angle 33 to the axis of the fiber to have a flat end 35. Silica telecom fiber 38 has been angle-cleaved at an approximately 80° to 84° angle α 36 to the axis of the fiber to have an angled end 37 with a tip 39.

Figure 4:
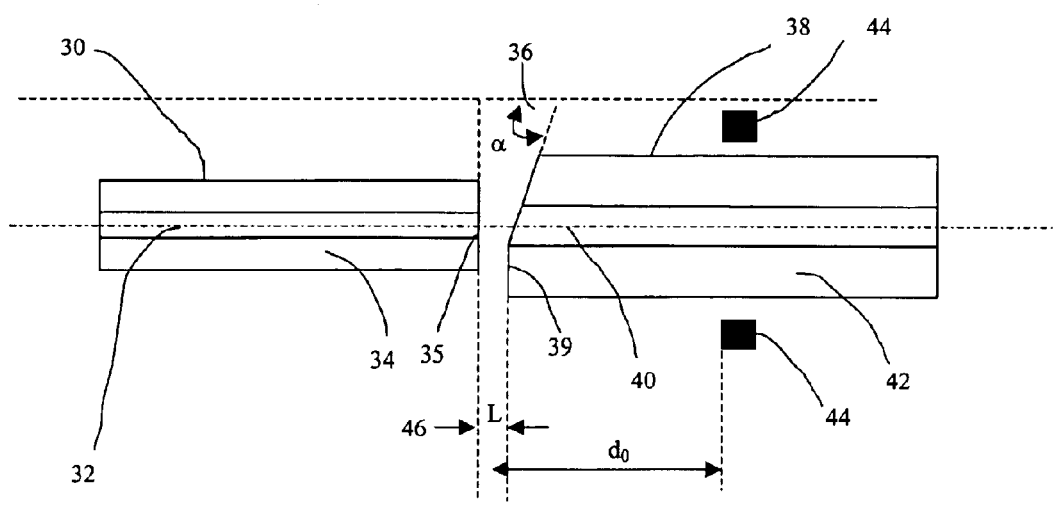
FIG. 4 is a diagram of an alternate embodiment of the angle fusion splice technique shown in FIG. 3 in which the tip of the angle-cleaved silica fiber is polished flat back to the core.

A heating element 44 is positioned on either side of or partially encircling silica fiber 38 at a distance $d_o$ from gap 46, which defines a separation L between the fiber centers. The heating element softens the glass at end 35 of specialty fiber 30 but not silica telecom fiber 38. Critically, the temperature of silica fiber 38 is raised to a temperature above the glass transition temperature of multi-component glass fiber 30 yet below that of silica. The optical fibers are then brought in contact. A matched angle at the end of multi-component fiber 30 is generated in situ during the splicing process. The softened glass hardens as the temperature is lowered below the softening and glass transition temperatures of the specialty fiber to form a permanent thermally diffused bond at angled splice 47 between the fibers as shown in FIG. 3b FIG. 4 depicts an alternate embodiment for angle fusion splicing the silica and multi-component fibers. In this embodiment, tip 39 of silica fiber 38 has been polished flat back close to the edge of core 40 prior to splicing. This significantly reduces the total distance over which silica fiber 38 has to be translated with respect to multi-component glass fiber 30 during the fusion splicing process. This in turn reduces the stress caused by asymmetric push distance with the angle cleaved silica fiber. Therefore, the loss and mechanical strength of the joint can be improved.

Attempts to fusion splice the fibers when the heating element 44 was placed at the gap 46 between the two fibers led to unsatisfactory results either due to excessive optical loss or inadequate mechanical strength. When the heating element was placed near the multi-component glass fiber, the temperature required to bring the multi-component glass above its softening temperature but below its melting temperature, did not bring the silica fiber to a temperature that is high enough to ensure a good bond. Placing the heater over the silica fiber and moving it away from the gap between the fibers by a distance $d_o$ can increase the temperature of the heater without melting the multi-component glass fiber directly. Silica fiber 38 is brought to a higher temperature and its angle-cleaved end 37 acts as the heating element for phosphate fiber 30 that is initially placed at a distance L from the end of the silica fiber and then brought into contact with the silica fiber when it is fusion spliced. Since the silica fiber is at a higher temperature, the diffusion processes and chemical reaction procedures that form the thermal diffusion bonds between the two fibers are more efficient leading to a bond with good tensile strength. Furthermore, it is believed that the use of the silica fiber to indirectly heat the multi-component glass fiber provides a more uniform heating, hence softening of the square-cleaved end 35 of fiber 30 thereby improving bonding strength.

Figure 5:
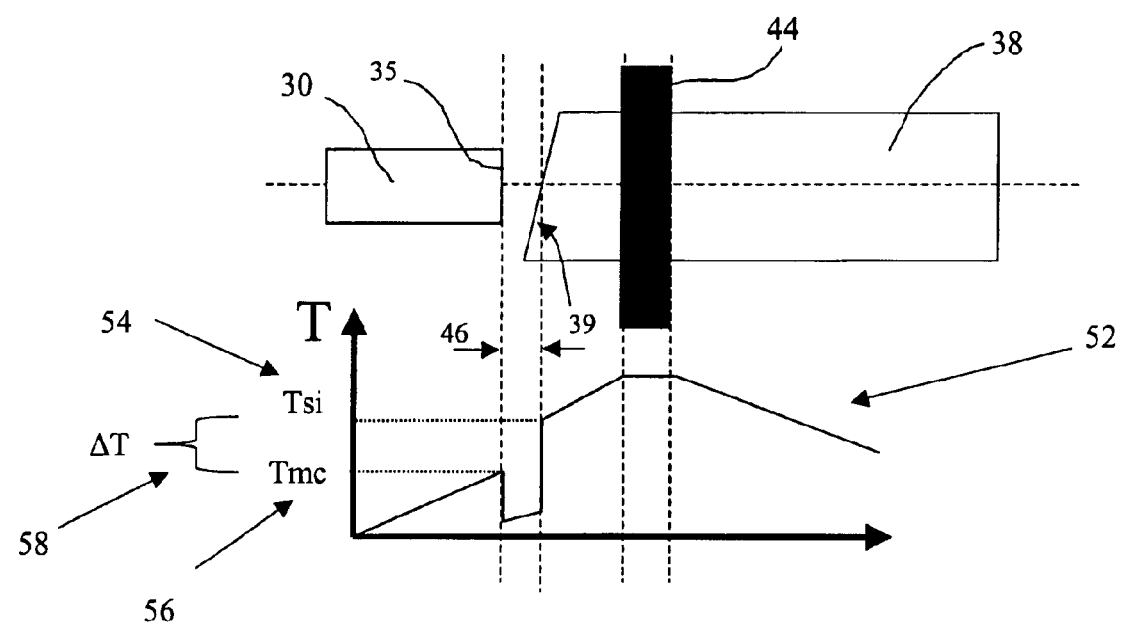
FIG. 5 is a plot of a representative temperature profile for the asymmetric geometry shown in FIG. 3.

FIG. 5 depicts a representative temperature profile 52 for the asymmetric configuration shown in FIG. 3. As shown the temperature is a maximum on silica fiber 38 at the position of heating element 44 and gradually decreases to a temperature 54 ($T_{si}$) at tip 39 of the silica fiber. On the other side of air gap 46, temperature 56 ($T_{mc}$) at flat end 35 of fiber 30 is lower such that the temperature gradient 58, $\Delta T = T_{si} - T_{mc} > 0$. By asymmetrically heating the fibers, the end of the silica fiber can be raised to a temperature that is higher than that at the end of the multi-component glass fiber. The resulting temperature gradient between the two fibers is essential to get low loss and high tensile strength simultaneously. To soften the multi-component glass fiber without softening the silica fiber, the silica fiber is heated so that $T_{si\text{-}soft} > T_{si} > T_{mc} > T_{mc\text{-}soft}$ where $T_{si\text{-}soft}$ and $T_{mc\text{-}soft}$ are the softening temperatures of the silica and multi-component glass fibers.

Asymmetric heating of the fiber has been achieved by using a Filament Fusion Splicing System, Model FFS-2000, Vytran Corporation. As shown in FIG. 5, the fusion splicing system places a thin filament 44 with a semi-circle profile around silica fiber 38. In this geometry, the heating element is in close proximity to the silica fiber and heating of the fiber is efficient. Temperature 54 ($T_{si}$) of the silica fiber is set to be much higher than that of the lower $T_g$ glass fiber and the temperature gradient 58 ($\Delta T$) between the fibers is set to be as large as possible without melting the multi-component glass. If the temperature is too high, the multi-component glass fiber gets soft enough to be bent under the influence of gravity. In this case, the end of the fiber goes out of alignment with the silica fiber and results in a splice with high optical loss. Angle splices performed at the right temperature in this geometry provide low loss and good mechanical strength.

A number of tests were run using the Vytran fusion splicer. Here the Vytran fusion splicer is taken as an example but the method can be implemented in principle with other fusion splicing machines available in the industry. The parameters for the angle splicing depend on the outside diameter and $T_g$ of the functional glass fiber. For the fusion splicing of a phosphate functional fiber (double cladding fiber F20-1B with outside diameter of 115 $\mu$m; first cladding diameter of 63.5 $\mu$m; and a core of 6.9 $\mu$m) with an 82° angle cleaved double cladding silica fiber (DC-3 with outside diameter of 124.1 $\mu$m, a first cladding of 91.3 $\mu$m, and a core of 6.7 $\mu$m), the following parameters were used: View to splicing distance, 1690 steps; Pre-gap, 8.0 $\mu$m; Pre-push 9.3 $\mu$m; Hot-push, 9.0 $\mu$m; Push velocity, 700 step/second; Hot push delay, 0.33 seconds; On-duration, 1.5 seconds; and Power, 9.5 W.

A "refuse" program was used three to five times to further reduce the loss and enhance the mechanical strength of the joint. A typical "refuse"program was: View to splicing distance, 1690 steps; Pre-gap, 0 μm; Pre-push, 0 μm; Hot-push 0.1 μm; Push velocity, 320 step/second; Hot push delay, 1.00 seconds; On-duration, 3.00 seconds; and power, 6.8 W. The angle fusion splice loss for 8 cm F20-1B fused with DC-3 on both ends was about 2.0±0.2 dB and for 15 cm is about 3.0±0.2 dB, respectively. The loss of the splice can be considered low since the propagation loss is 0.12 dB/cm and loss caused by mode field diameter mismatch is 0.08 dB/joint. The mechanical strength is usually around 20 grams to higher than 100 grams pull strength.

Multiple splicing experiments performed under different conditions for different phosphate functional fiber and DC-3 have shown that the quality of the splice was strongly dependent on the position of the heating element along the silica fiber, and on the following parameters:

- $d_0$: distance from the heater to the end facet of the standard silica fiber, related directly to the parameter "view to splicing distance";
- α: angle of the angle-cleaved end of the silica fiber;
- T(w): temperature of the heater, which is a function of power (w) supplied, related directly to parameters "Power" and "On-duration τ"; and
- τ: On-duration of the heating.

For a given fiber, there exist one or several sets of parameters $\{d_0,\alpha,T,\tau\}$ that lead to low loss, low back reflection and high tensile strength. Experience shows that the number of sets of parameters that lead simultaneously to low loss and high tensile strength is limited. The following trends have been observed:

- at a fixed $d_0$ when increasing T over its optimum values, tensile strength is high but optical loss is also high.
- when decreasing the temperature T and increasing the duration of heating τ, optical loss can be kept low but the tensile strength is poor.
- When selecting α the general rule is the smaller the angle away from 90°, the higher the back reflection the lower fusion splice loss and the stronger the mechanical strength. There is a trade-off between loss, mechanical strength and back reflection. The angle should be chose from 90° to 75° (the upper limit of cleaving angle for FK12 Angled Fiber Cleaver, PK technology) depending on the difference of refractive index (Δn) between two fibers. The larger the value of Δn, the larger the deviation from a 90° angle should be selected so that the back reflection can be reduced as much as possible. It was found that an angle of 82–83° is good enough for fusion splicing phosphate fibers with silica fibers.

The power (temperature) of the heater has an upper value of 18 W. Above this value the silica fiber starts to soften and bends under gravity, and the end of the fiber goes out of alignment with the phosphate fiber and results in high optical loss.

In general, the parameters assume values in the following approximate ranges: $d_0$ ranges from 10 to 1000 microns, α is between 90° to 75°, T (W) is around 6 W to 18 W and τ is around 0.1 to 10 s. Outside the defined parameter space for a given glass composition and fiber diameter, tensile strength and back reflection optima are lost in some cases, or optical loss in others. A good splice requires simultaneously low loss, low back reflection and high tensile strength.

Figure 6A:
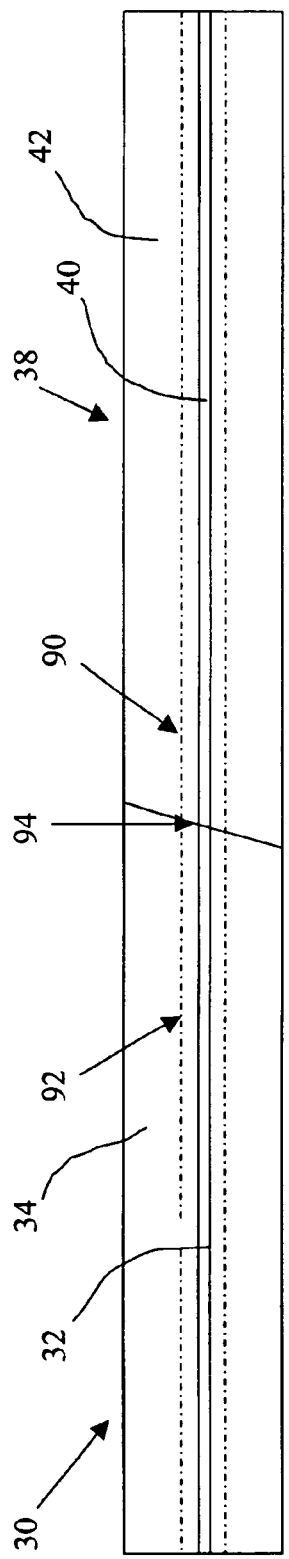
FIGS. 6a and 6b are sectional views of the angle fusion splice for two different multi-component glass fibers.

FIG. 6a illustrates a fusion-spliced multi-component fiber 30 and silica telecom fiber 38. In this particular fiber, the core and cladding diameters of the two fibers are matched. Mode-field 90 in the silica fiber (indicated by the dashed line) extends significantly outside core 40. The numerical aperture and core diameter of multi-component fiber 30 are preferably adjusted to match its mode field 92 to mode field 90 in the silica fiber to minimize optical losses at the angle fusion splice 94. For example, a NA=0.135 and core diameter of 8.4 microns was tested.

Figure 6B:
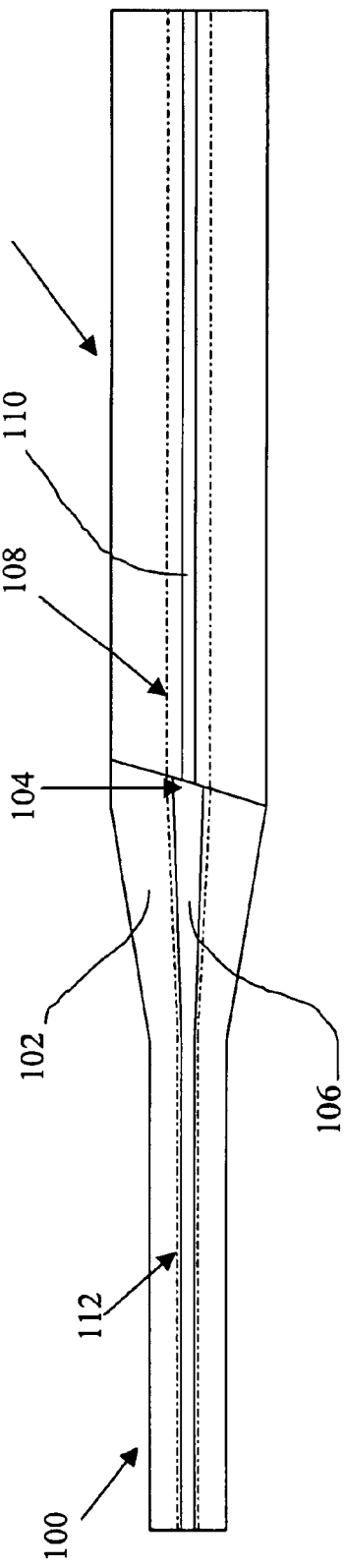

FIG. 6b illustrates the fusion-splice of a different multi-component glass fiber 100 with a telecom fiber 101. In this particular embodiment, the outer diameter of the specialty fiber (90 microns) is smaller than the outer diameter of the telecom fiber (125 microns). When the fibers are fusion spliced, the specialty fiber exhibits a taper 102 or flare so that its outer diameter approximately matches the telecom fiber at fusion splice 104. As a result, the fiber's core 106 is tapered so that it is wider at the splice joint. Mode field 108 in the silica fiber extends significantly outside core 110. The multi-component fiber is designed so that its mode field 112 (NA=0.17, Core diameter of 6 microns) is substantially overlapping with its core 106. Therefore, the taper of core 106 has the desirable effect of closely matching the specialty fiber's mode field 112 to the silica fiber's mode field 108.

FIG. 7 depicts an enlarged view of angle fusion-splice joint 94 shown in FIG. 6a. The fusion splicing process causes a number of modifier and intermediator ions in the multi-component glass fiber to diffuse across joint 94 into the silica glass in a transition region 120. Although the multi-component glasses do not crystallize above a given temperature, the hybrid Si-x glass where x is a mixture of modifier and intermediator ions in the transition region 120 does exhibit a transition temperature $T_x$. Crystallization turns the glass opaque, which makes optical losses unacceptably high. Therefore $T_x$ establishes another upper bound on the fusion temperature, specifically $T_{si}$.

Thus, the heating and temperature profiles are constrained as follows:

$$T_{mc\text{-}soft} < T_{mc} < T_{si} < \min(T_{mc\text{-}melt}, T_{si\text{-}soft}, T_{si\text{-}trans}, T_x)$$

where $T_{mc\text{-}soft}$ is the softening temperature of the multi-component glass, $T_{mc}$ is the temperature at the end of the multi-component glass fiber, $T_{si}$ is the temperature at the end of the silica fiber $T_{mc\text{-}melt}$ is the melting temperature of the multi-component glass, $T_{si\text{-}trans}$ is the glass transition temperature of silica and $T_x$ is the crystallization temperature of Si-x in the transition region at the fusion splice. As a point of reference, as the temperature of most glass material is raised the glass undergoes a number of transitions. First, at the glass transition temperature the molecules begin to have limited ability to move. Second, the glass becomes viscous at a softening temperature typically 10–20° C. higher than the glass transition temperature. Next, certain glasses (not multi-component glasses) crystallize at a crystallization temperature, which is another 40–80° C. higher. Finally, the glasses will reach a point where they no longer can maintain structure and melt, i.e. the melting temperature.

The addition of an outer cladding on the multi-component fiber can be used to further strengthen the angle fusion splice of a phosphate glass fiber or to enable angle fusion splicing of other even lower temperature glass compositions such as tellurite. The multi-component glass fiber is drawn with an outer cladding that is chemically and thermally compatible with both the multi-component glass fiber and silica fiber. More specifically, the material for the outer cladding will be a different multi-component glass and have a softening temperature that is higher than that of the core and inner cladding multi-component glass but close enough that the two materials can be drawn together in a fiber. The outer cladding material will also exhibit a glass network that is similar to that of silica in order to form strong thermal diffusion bonds. The fibers are heated using the asymmetric configuration just described or, possibly, a conventional symmetric configuration, to above the softening temperatures of the multi-component glasses but below the softening temperature of silica and then brought together to form the splice. The higher softening temperature of the outer cladding may make conventional fusion splicing feasible in some cases. As a result, optical performance is dictated by the core and inner cladding while mechanical performance is determined by the outer cladding. The ability to draw, rather than deposit, the outer cladding greatly simplifies the process, which lowers cost.

Figure 8A:
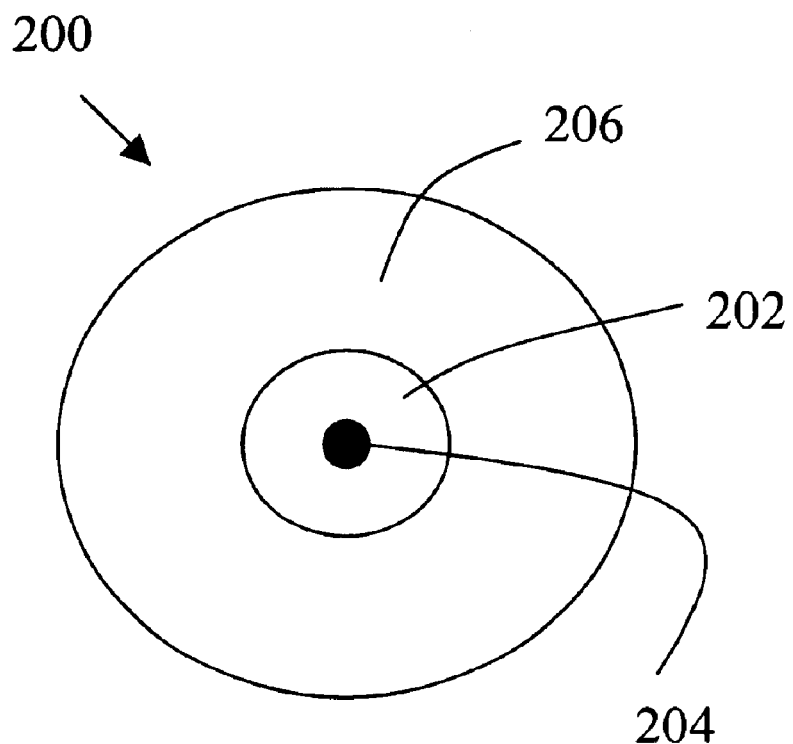
FIGS. 8a and 8b are cross-sectional diagrams of multi-component glass fibers drawn with an outer cladding.

In one embodiment, a multi-component glass fiber 200 shown in FIG. 8a includes an inner cladding 202 around a core 204 formed from the same multi-component glass host material and an outer cladding 206 formed around inner cladding 202 of a thermally compatible yet higher softening temperature material whose network is more similar to that of silica. The outer cladding may or may not function to confine light inside the inner cladding; i.e. the refractive index of the outer cladding $n_{oc}$ may be greater than or less than the refractive index of the inner cladding $n_{ic}$. The cross-sectional area of the outer cladding is preferably at least 50% of the fiber's cross-sectional area. For example, the diameters of the core, inner cladding and outer cladding are suitably about 4–10 microns, 15–70 microns and 60–125 microns, respectively. As a result, the optical properties are dictated by the first multi-component glass in the core and inner cladding and the mechanical properties of the angle fusion splice are dominated by the thermal diffusion bonds between silica and the second multi-component glass.

Figure 9:
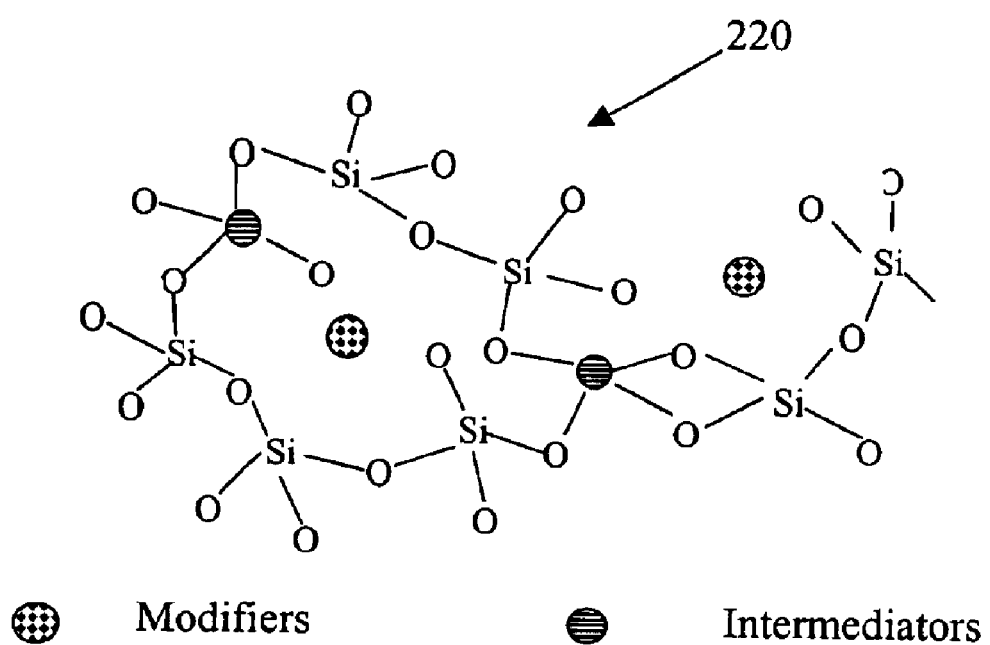
FIG. 9 is a diagram of the glass network for silicate.

Specific examples include, the phosphate or germanate glass fibers described above, which have similar softening temperatures >600° C., drawn together with a silicate (30%–80% $SiO_2$) outer cladding, which exhibits a softening temperature range from 400 to 900° C. As illustrated in FIG. 9 silicate has a glass network 220 similar to pure silica but with a softening temperature much closer to the other multi-component glasses. In this example, the inner cladding also acts as a barrier to prevent diffusion of hydroxide ($OH^-$) ions from the outer cladding into the core. Silicate glasses suitable for the outer cladding comprise a glass network of silicon oxide ($SiO_2$) from 30 to 80 percent, a glass network modifier MO from 5 to 40 percent, and a glass network intermediator $M_2O_3$ from 5 to 30 percent, MO is selected from alkaline earth oxides and transition metal oxides consisting of BaO, BeO, MgO, SrO, CaO, ZnO, PbO and mixtures thereof, and $M_2O_3$ is selected from $Al_2O_3$, $B_2O_3$, $Y_2O_3$, $La_2O_3$, and mixtures thereof.

In another example, tellurite glass, which has a much lower softening temperature <400° C., is fusion spliced with silica fiber in a similar procedure.

Figure 8B:
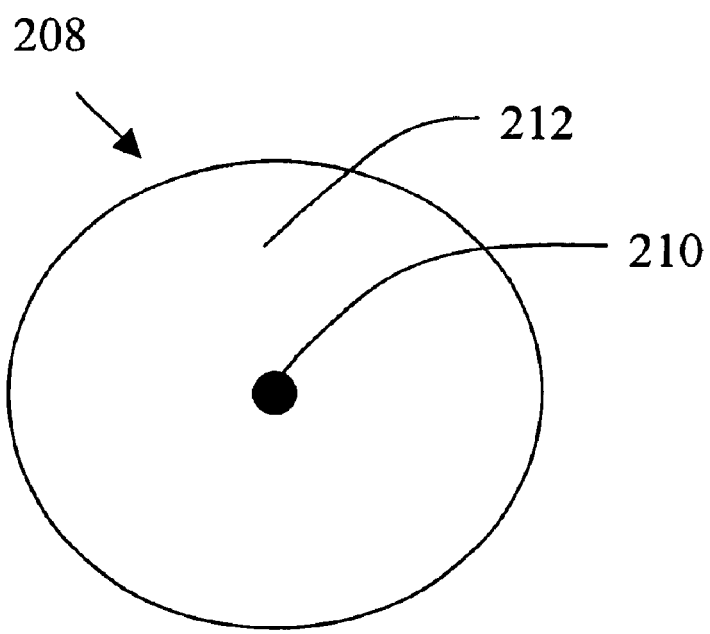

In another embodiment shown in FIG. 8b, a specialty multi-component glass fiber 208 is drawn without the inner cladding such that core 210 is formed from one type of multi-component glass and an outer cladding 212 is formed from a thermally compatible yet higher softening temperature material whose network is more similar to that of silica. In this embodiment, the cladding material must be carefully selected and special steps must be taken during fabrication to minimize any diffusion of $OH^-$ ions from the cladding into the core.

In either case, the outer cladding must be chemically and thermally compatible with both the multi-component glass fiber and silica fiber to form low loss and strong thermally diffused bonds with silica. Based on the principle of "like dissolves like", silica has a very high solubility of silicate so that they can form a strong bond on interface. As discussed previously in FIG. 1, silica glass consists of $SiO_4$ tetrahedra joined to each other at corners. Each oxygen acts as a bridge between neighboring tetrahedra. This bonding structure results in a high softening temperature. When glass network modifiers and intermediators are added into the silica, the so-called silicate glass 220 is formed as shown in FIG. 9. The positive charge of network modifiers is satisfied by an ionic bond to an oxygen. This is accomplished by breaking a bridge and attaching an oxygen to the broken bridge. The intermediators sometimes can bridge the broken network together. Overall the structure of silicate glass exhibits a reduced connectivity compared to silica glass, and hence, the structure has more freedom to move and expand. Therefore, the softening temperature is lower compared to silica glass.

Figure 10:
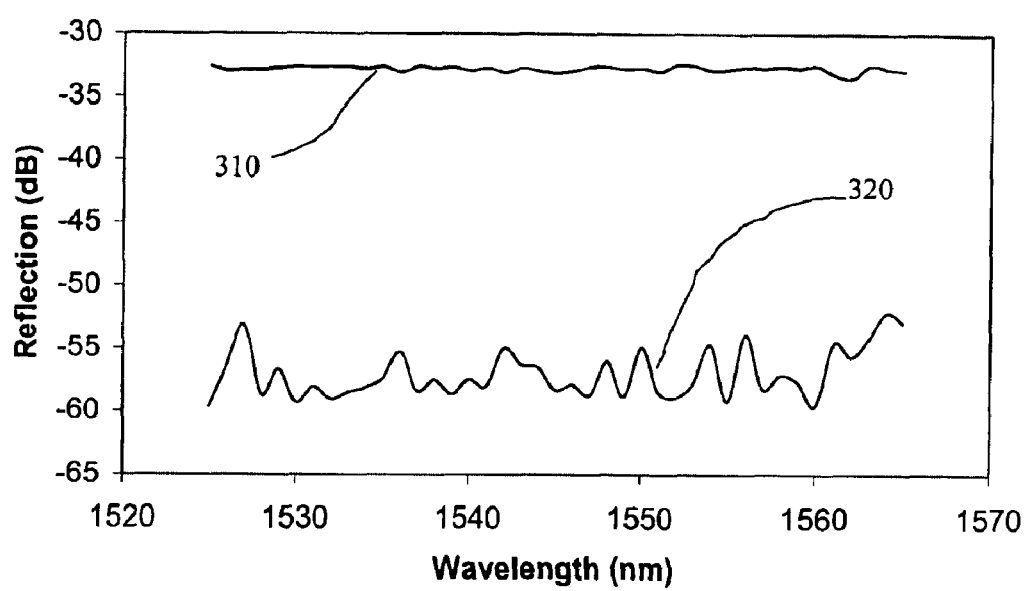
FIG. 10 is a graph showing the reflection loss as a function of the wavelength of the incident light measured in two different fiber assemblies.

The importance of angled fusion splicing on back reflection is illustrated in FIG. 10. Back reflection was measured in two different devices in which a 8 cm long phosphate glass fiber was spliced at both ends to a silica fiber. For a device in which one end of the phosphate glass fiber was angled spliced to a silica fiber and the other end was flat and spliced to a second silica fiber, the back reflection 310 at wavelengths covering the C-band of Erbium was higher than −35 dB. In contrast, in a device in which the same fiber was angled spliced to two silica fibers at both ends, the measured back reflection 320 was below −50 dB. The noise figure and the relative output power fluctuations were measured in these two devices and were reduced from 5.0 dB to 4.8 dB, and from 0.4 dB to 0.02 dB, respectively, when the second end was also angled fusion spliced.

While several illustrative embodiments of the invention have been shown and described, numerous variations and alternate embodiments will occur to those skilled in the art. For example, the invention is not limited to only low-temperature multi-component glass but can be easily applied to angle fusion splicing other low-temperature non-silica fibers such as tellurite or bismuth based glass to standard silica fiber. Such variations and alternate embodiments are contemplated, and can be made without departing from the spirit and scope of the invention as defined in the appended claims.

We claim:

1. A method of fusing optical fiber, comprising:
   Providing an angle-cleaved optical fiber formed of a silica glass;
   Providing a square-cleaved optical fiber formed of a non-silica glass;
   Placing the pair of optical fibers in an end-to-end configuration with a small gap separating the fibers; and
   Heating and moving the fibers together to soften the square-cleaved optical fiber such that it forms a matched angle to the angle-cleaved optical fiber in situ to form an angled fused joint.

2. The method of claim 1, wherein heating the fibers does not soften the angle-cleaved optical fiber.

3. The method of claim 2, wherein the fibers are heated asymmetrically to raise the temperature at the ends of the angle-cleaved optical fiber ($T_{gi}$) and the square-cleaved optical fiber ($T_{mc}$) such that $T_{si} > T_{mc} > T_{mc}$-soft $> T_{max}$ at the gap between the fibers where $T_{mc\text{-}soft}$ is the softening temperature of the non-silica glass and $T_{max}$ is a maximum temperature thereby softening only the square-cleaved fiber.

4. The method of claim 3, wherein $T_{max}$ is min ($T_{si\text{-}soft}$, $T_{mc\text{-}melt}$, $T_{si\text{-}trans}$, $T_x$) where $T_{si\text{-}soft}$ is the softening temperature of the silica glass, $T_{mc\text{-}melt}$ is the melting temperature of the non-silica glass, $T_{si\text{-}trans}$ is the glass transition, temperature of silica and $T_x$ is the crystallization temperature of Si-x in a transition region at the fused joint.

5. The method of claim 3, wherein the step of asymmetrically heating the fibers includes:
   Placing a heating element proximate to the angle-cleaved optical fiber at a distance $d_o$ from the small gap that separates the fibers; and
   Activating the heating element to generate heat.

6. The method of claim 5, wherein heating electrodes or filaments are placed on either side of the angle-cleaved optical fiber to heat the angle-cleaved optical fiber.

7. The method of claim 1, further comprising refusing the fused joint.

8. The method of claim 1, wherein the angle-cleaved optical fiber comprises a core surrounded by a cladding which is angle-cleaved to form a tip, further comprising the step of polishing the tip of the angle-cleaved fiber flat back to at or near its core.

9. The method of claim 1, wherein the optical fibers each comprise a core surrounded by a cladding having the same diameter, the numerical aperture of said non-silica glass fiber being selected to match the mode field of the silica glass fiber.

10. The method of claim 1, wherein the optical fiber each comprise a core surround by a cladding, said silica fiber cladding having a larger diameter than said non-silica fiber cladding such that said non-silica fiber flares at the fused joint to equate the fiber's diameters thereby making the core of the non-silica fiber greater than that of the silica fiber, the numerical aperture of said non-silica fiber being selected so that its mode field substantially overlaps its core to match the mode field of the silica fiber.

11. The method of claim 1, wherein the non-silica glass is selected from a multi-component glass of phosphate, germanate or tellurite glass.

12. The method of claim 11, wherein said square-cleaved optical fiber is drawn with an outer cladding formed from a different multi-component glass having a higher softening temperature and a glass network that is more compatible with forming strong thermal diffusion bonds with the silica glass.

13. The method of claim 12, wherein the cross-sectional area of the outer cladding is at least fifty percent of the total cross-sectional area of the square-cleaved optical fiber.

14. The method of claim 12, wherein said outer cladding multi-component glass is a silicate glass that comprises a glass network of silicon oxide ($SiO_2$) from 30 to 80 percent, a glass network modifier MO from 5 to 40 percent, and a glass network intermediator $L_2O_3$ from 5 to 30 percent, MO is selected from alkaline earth oxides and transition metal oxides consisting of BaO, BeO, MgO, SrO, CaO, ZnO, PbO and mixtures thereof, and $L_2O_3$ is selected from $Al_2O_3$, $B_2O_3$, $Y_2O_3$, $La_2O_3$, and mixtures thereof.

15. The method of claim 1, wherein the angle-cleaved fiber is cleaved with an angle of 80 to 84 degrees.

16. A method of fusing optical fiber, comprising:
   Providing an angle-cleaved optical fiber formed of a silica glass;
   Providing a square-cleaved optical fiber formed of a non-silica glass, wherein the non-silica glass is a multi-component glass that comprises a glass network former selected of phosphorus oxide, germanate oxide or tellurite oxide from 30 to 80 percent, a glass network modifier MO from 2 to 40 percent, and a glass network intermediator $L_2O_3$ from 2 to 30 percent, wherein MO is selected from alkaline earth oxides and transition metal oxides consisting of BaO, BeO, MgO, SrO, CaC, ZnO, PbO and mixtures thereof, and $L_2O_3$ is selected from $Al_2O_3$, $B_2O_3$, $Y_2O_3$, $La_2O_3$, and mixtures thereof;
   Placing the pair of optical fibers in an end-to-end configuration with a small gap separating the fibers; and
   Heating and moving the fibers together to form an angled fused joint.

17. A method of fusing optical fiber, comprising:
   Providing an angle-cleaved optical fiber formed of a silica glass having a softening temperature $T_{si\text{-}soft}$;
   Providing a square-cleaved optical fiber formed of a multi-component glass having a softening temperature $T_{mc\text{-}soft}$ that is lower than $T_{si\text{-}soft}$, wherein the multi-component glass comprises a glass network former selected of phosphorus oxide, germanate oxide or tellurite oxide from 30 to 80 percent, a glass network modifier MO from 2 to 40 percent, and a glass network intermediator $L_2O_3$ from 2 to 30 percent, wherein MO is selected from alkaline earth oxides and transition metal oxides consisting of BaO, BeO, MgO, SrO, CaO, ZnO, PbO and mixtures thereof, and $L_2O_3$ is selected from $Al_2O_3$, $B_2O_3$, $Y_2O_3$, $La_2O_3$, and mixtures thereof;
   Placing the pair of optical fibers in an end-to-end configuration with a small gap separating the fibers;
   Asymmetrically heating the fibers to raise the temperature of the angle-cleaved optical fiber ($T_{si}$) and the square-cleaved optical fiber ($T_{mc}$) such that $T_{si\text{-}soft} > T_{si} > T_{mc} > T_{mc\text{-}soft}$ at the gap between the fibers thereby softening only the square-cleaved fiber; and
   Moving the fibers together such that the softened square-cleaved optical fiber forms a matched angle to the angle-cleaved optical fiber in situ thereby forming thermal diffusion bonds between the pair of fibers around an angled fused joint.

18. The method of claim 17, wherein $T_{si} <$ min ($T_{si\text{-}soft}$, $T_{mc\text{-}melt}$, $T_{si\text{-}trans}$, $T_x$) where $T_{mc\text{-}melt}$ is the melting temperature of the non-silica glass, $T_{si\text{-}trans}$ is the glass transition temperature of silica and $T_x$ is the crystallization temperature of Si-x in a transition region at the fused joint.

19. The method of claim 17, wherein the step of asymmetrically heating the fibers includes:
   Placing a heating element proximate to the angle-cleaved optical fiber at a distance $d_o$ from the small gap that separates the fibers; and
   Activating the heating element to generate heat.

20. The method of claim 17, further comprising refusing the fused joint.

21. The method of claim 17, wherein the angle-cleaved optical fiber comprises a core surrounded by a cladding which is angle-cleaved to form a tip, further comprising the step of polishing the tip of the angle-cleaved fiber flat back to at or near its core.

22. The method of claim 17, wherein the angle-cleaved fiber is cleaved with an angle of 80 to 84 degrees.

23. A method of fusing optical fiber, comprising:
   Providing an angle-cleaved optical fiber having a core and cladding formed of a silica glass having a softening temperature $T_{si\text{-}soft}$;
   Providing a square-cleaved optical fiber having a core and inner cladding formed of a multi-component glass with a softening temperature $T_{mc\text{-}soft}$ and having an outer cladding formed from a different multi-component glass having a softening temperature $T_{oc\text{-}soft}$ so that $T_{mc\text{-}soft} < T_{oc\text{-}soft} < T_{si\text{-}soft}$;

Placing the pair of optical fibers in an end-to-end configuration with a small gap separating the fibers;

Asymmetrically heating the fibers to raise the temperature of the angle-cleaved optical fiber ($T_{si}$) and the square-cleaved optical fiber ($T_{mc}$) such that $T_{si\text{-}soft} > T_{si} > T_{mc} > T_{oc\text{-}soft}$ at the gap between the fibers thereby softening only the square-cleaved fiber; and Moving the fibers together such that the softened square-cleaved optical fiber forms a matched angle, to the angle-cleaved optical fiber in situ thereby forming thermal diffusion bonds between the pair of fibers around an angled fused joint.

24. The method of claim 23, wherein the cross-sectional area of the outer cladding is at least fifty percent of the total cross-sectional area of the square-cleaved optical fiber so that the optical performance at the fused joint is dictated by the core and inner cladding while mechanical performance is determined by the outer cladding of the square-cleaved fiber.

25. The method of claim 23, wherein said outer cladding multi-component glass is a silicate glass that comprises a glass network of silicon oxide ($SiO_2$) from 30 to 80 percent, a glass network modifier MO from 5 to 40 percent, and a glass network intermediator $L_2O_3$ from 5 to 30 percent, MO is selected from alkaline earth oxides and transition metal oxides consisting of BaO, BeO, MgO, SrO, CaO, ZnO, PbO and mixtures thereof, and $L_2O_3$ is selected from $Al_2O_3$, $B_2O_3$, $Y_2O_3$, $La_2O_3$, and mixtures thereof.

* * * * *